United States Patent [19]
Singbartl

[11] Patent Number: 5,341,117
[45] Date of Patent: Aug. 23, 1994

[54] DEVICE FOR MAINTAINING THE POSITION OF A COIL SUPPORT IN A CUP-SHAPED CASING PART

[75] Inventor: Günther Singbartl, Hanover, Fed. Rep. of Germany

[73] Assignee: WABCO Westinghouse Fahrzeugbremsen GmbH, Hanover, Fed. Rep. of Germany

[21] Appl. No.: 469,963

[22] Filed: Jan. 25, 1990

[30] Foreign Application Priority Data

Jan. 26, 1989 [DE] Fed. Rep. of Germany ....... 3902218

[51] Int. Cl.$^5$ ................. H01F 27/02; G01P 3/481; G01R 33/00
[52] U.S. Cl. ........................ 336/92; 336/65; 324/173; 324/174; 324/261
[58] Field of Search ............ 336/92, 90, 94, 96, 336/98, 65, 67, 68; 324/173, 174, 207.15, 261, 262

[56] References Cited
U.S. PATENT DOCUMENTS

3,581,259  3/1991  Burnside ............... 336/90

Primary Examiner—Leo P. Picard
Assistant Examiner—R. Barbera
Attorney, Agent, or Firm—Horst M. Kasper

[57] ABSTRACT

In a device for positional fixation of a coil support in a cup-shaped formed casing part, wherein a closure part (4, 8) is attached to the cup-shaped casing part (1, 2, 22). Said closure part (4, 8) is disposed on the side of the coil support (10, 19, 21), located remotely relative to the floor (22) of the cup-shaped casing part (1, 2, 22), in or, respectively, at the cup-shaped casing part (1, 2, 22). Tongue-shaped adjuncts (9, 33) are furnished at the closure part (4, 8). Said tongue-shaped adjuncts (9, 33) extend in a direction toward the coil support (10, 19, 21) and exhibit nose-shaped protrusions (13, 29) directed toward the wall of the coil support (10, 19, 21). Projections (11, 31) or, respectively, recesses (12, 30), are formed like a lock toothing, and are furnished at the coil and are disposed toward the tongue-shaped adjuncts (9, 33). Said projections (11, 31) or recesses (12, 30) coact with the nose-shaped protrusions (13, 29) of the tongue-shaped adjuncts (9, 33) of the closure part (4, 8) like a lock snap engagement. The coil support (10, 19, 21) is brought to rest, in the sense of an adjustment step process at the floor (22) of the cup-shaped casing part (1, 2, 22), by way of the locking engagement between the closure part (4, 8) and the coil support (10, 19, 21) upon insertion of coil support (10, 19, 21) and closure part (4, 8) into the cup-shaped casing part (1, 2, 22), and the coil support (10, 19, 21) is maintained in rest position relative to the cup-shaped casing part (1, 2, 22).

32 Claims, 4 Drawing Sheets

DEVICE FOR MAINTAINING THE POSITION OF A COIL SUPPORT IN A CUP-SHAPED CASING PART

BACKGROUND OF THE INVENTION

1. Field of the Invention

The invention relates to a device for the fixation in position of a coil support in a cup-shaped casing part, in particular for the coil support of a pulse tacho-generator, which pulse tacho-generator includes a closure part, disposed on the side remote from the floor of the cup-shaped casing part of the coil support.

2. Brief Description of the Background of the Invention Including Prior Art

A device of the above-recited kind is known from the German Patent Application Laid Open DE-OS 35 30 288. The reference teaches a pulse tacho-generator, where the coil support and the closure part are formed as a single-piece device unit. This device unit is mechanically connected to the cup-shaped casing part upon insertion. This conventional device is associated with the disadvantage that, based on the tolerances of the dimensions at the coil support and at the cup-shaped casing part, there can occur the situation where, for example, a slot is generated between the coil support and the casing floor, and thus the coil does not assume the most favorable position for an effective functioning, in particular relative to the casing floor.

SUMMARY OF THE INVENTION

1. Purposes of the Invention

It is an object of the invention to provide a device for fixation of position of a coil support which device allows to premount and preassemble the closure part and the coil support and to fix the closure part and the coil support in the casing independent of tolerances, in particular relative to the casing floor.

It is another object of the present invention to provide a mounting construction for a coil support which can be easily and precisely assembled.

It is yet a further object of the present invention to provide a coil support which is effective in allowing a maximum and reliable interaction of the coil with the surrounding alternating magnetic fields.

These and other objects and advantages of the present invention will become evident from the description which follows.

2. Brief Description of the Invention

The present invention provides for an arrangement of a coil supported in a cup-shaped formed casing part. A closure part is disposed on the side of the coil support, remote relative to the floor of the cup-shaped casing part, at the cup-shaped casing part. A retaining means is disposed at one of oppositely disposed surfaces of the closure part and of the coil support. The retaining means is formed to transmit a clamping tension exerted by the coil support in the direction toward the floor of the cup-shaped casing part after application of the closure part to the coil support for furnishing a force-matching and/or form-matching connection of the closure part to the coil support.

The coil support and the cup-shaped part can be constructed for supporting a pulse tacho-generator.

The retaining means can be formed as matchingly engaging mechanical structures of a protrusion associated with the closure part and of a recess furnished in association with the coil support. Said recess and projection can cooperate according to the kind of a snap and lock connection.

The retaining means can be formed as matchingly engaging mechanical structures of a recess associated with the closure part and of a protrusion furnished in association with the coil support. Said recess and projection can cooperate according to the kind of a snap and lock connection.

Tongue-shaped adjuncts can be attached to the closure part on the side of the closure part disposed toward the coil support. Said tongue-shaped adjuncts can be running substantially parallel to a longitudinal axis of the cup-shaped casing part. The tongue-shaped adjuncts can extend over part of the coil support. A protrusion can be located at each of said tongue-shaped adjuncts. Said protrusion can run perpendicular to a longitudinal axis of the tongue-shaped adjuncts and extending in the direction toward the coil support. An engagement means, aligned substantially perpendicular to the longitudinal axis of the coil support, can be furnished at the coil support. Said engagement means can coact and engage with the protrusion of the tongue-shaped adjuncts of the cable feed-through in the kind of a locking engagement.

Tongue-shaped adjuncts can be disposed on the coil support, on the side of the coil support disposed toward the closure part. Said tongue-shaped adjuncts can extend toward the closure part and can be aligned substantially parallel to a longitudinal axis of the cup-shaped casing part. A protrusion can be furnished at each of the adjuncts. Said protrusion, aligned substantially perpendicular to a longitudinal axis of the adjuncts and the protrusion, can extend in the direction of a part of the cable feed-through. Projections and recesses can be furnished at the closure part. Said projections and recesses, running substantially perpendicular to the longitudinal axis of the closure part, can cooperate with and engage the protrusions at the tongue-shaped adjuncts of the coil support in the kind of a locking engagement.

Retaining means includes:

Tongue-shaped adjuncts attached to the closure part for engaging the coil support. The tongue-shaped adjuncts can be disposed on the side of the closure part toward the coil support. Said tongue-shaped adjuncts can extend from the closure part and can run substantially parallel to a longitudinal axis of the cup-shaped casing part. Protrusion, furnished to each of the adjuncts, can be aligned substantially perpendicular to a longitudinal axis of the adjuncts and can extend in the direction of a part of the cable feedthrough.

Projections and recesses, furnished at the coil support, can be aligned substantially perpendicular to the longitudinal axis of the coil support. Said projections and recesses can cooperate with and engage the protrusion of the tongue-shaped adjuncts as a locking engagement.

Rail-like parts can be attached to the closure part. The projections and recesses can be delimited by said rail-like parts. Said rail like parts can be aligned in parallel to a longitudinal axis of the tongue-shaped adjuncts. Said rail-like parts can serve as a guide for the tongue-shaped adjuncts. The rail-like parts can be disposed at the coil support in the region of the projections and recesses.

Each of the tongue-shaped adjuncts can exhibit a breakout, where an offshoot, provided at the coil support, can engage into said breakout. An extension can be attached to each of the tongue-shaped adjuncts and can be disposed on the side directed toward the inner wall of the cup-shaped casing part. Said extension can rest under tensioning at the inner wall of the cup-shaped casing part.

A permanent magnet can be disposed in the coil support. A pole pin can be connected to the permanent magnet in the direction of the floor of the cup-shaped casing part. An elastic element can be supported at the closure part. The elastic element can apply force to the permanent magnet and thereby to the pole pin connected to the permanent magnet. The elastic element can be formed by a spring.

Said retaining means for a force-matching connection of the closure part and the coil support can be formed by a recess. Said recess can be provided in each case at a first surface opposed to one device part, coil support or closure part and one protrusion, provided in each case at a second surface of the other device part, closure part or coil support and said second surface opposed to the first surface. Said recess and projection can coact in the kind of a frictionally engaging plug connection. The retaining means for the force-matching connection of the closure part and of the coil support can also be formed by a tubular body, defining, respectively a first device part or a corresponding second device part, and disposed in each case at a first one of these two device parts, and by a protrusion, disposed in each case at a second one of these two device parts. The protrusion can engage the tubular part by way of a kind of friction-matching plug connection. The retaining means for the force-matching connection of the closure part and of the coil support can be formed by a tubular body disposed in each case at a first device part, and in each case a protrusion can be formed at a second device part. Said protrusion engages by way of a kind of friction-matching plug connection. The retaining means for the force-matching connection of the closure part and the coil support can be formed by clamping elements, disposed in each case at a surface of one device part, closure part, or coil support. Said clamping elements can engage in each case a second surface opposed to the first surface and located at a device part, coil support or closure part.

The closure part can be formed as a cable feed-through for a cable connecting the electrical device parts disposed in the casing to an electrical device part disposed outside of the casing.

The present invention is in particular associated with the advantage of providing a precise positional fixation of the coil support with respect to an assembly process relative to the casing floor based on a force and shape-matching connection between the closure part and the coil support. The closure part engages and clamps the coil support by pretensioning the coil support in the direction toward the floor of the cup-shaped casing part. The shape-matching connection between the closure part and the coil support formed by way of an interlocking toothing in an advantageous fashion.

The interlocking toothing is constructed according to an embodiment of the invention such that, after the insertion of the device unit, including a coil support and a closure part, into the cup-shaped casing part, the tongue-shaped adjuncts of the closure part or outwardly directed extensions, disposed at the tongue-shaped adjuncts, are loaded outwardly in the direction to the inner wall of the casing and thus rest at the inner wall of the casing. This step additionally provides a positional fixation of the coil support in a direction perpendicular to the longitudinal axis of the casing.

Advantageously, the closure part is furnished as a cable feed-through for a cable connecting the electrical device parts disposed in the casing, to the device parts disposed outside of the casing.

According to an advantageous embodiment of the invention, a spring element is furnished between the closure part and the permanent magnet in connection with the soft-magnetic pole pin, which spring element retains the pole pin in a rest position at the floor of the casing.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which is shown one of the various possible embodiments of the present invention.

DESCRIPTION OF INVENTION AND PREFERRED EMBODIMENT

According to the present invention, there is provided an arrangement for fixing the position of a coil support 10, 19, 21 in a cup-shaped formed casing part 1, 2, 22, in particular for the coil support 10, 19, 21 of a pulse tacho-generator. Said pulse tacho-generator includes a closure part 4, 8 serving as a cable feed-through. The closure part 4, 8 is disposed on the side of the coil support 10, 19, 21 remote relative to the floor 22 of the cup-shaped casing part 1, 2, 22 in the or, respectively, at the cup-shaped casing part 1, 2, 22. At the closure part 4, 8 and/or at the coil support 10, 19, 21, there are provided retaining means for forming a force-matching or form-matching connection of the closure part 4, 8 with the coil support 10, 19, 21. The retaining means are formed such that the closure part 4, 8 is applied to the coil support 10, 19, 21 under generation of clamping tension exerted by the coil support in the direction toward the floor 22 of the cup-shaped casing part 1, 2, 22.

The retaining means can be formed of matchingly engaging mechanical structures of at least one protrusion 13 or, respectively, 29 and/or recess at the closure part 4, 8 or one part connected to the closure part 4, 8 and of at least one recess 12 or, respectively, 30 furnished at the coil support 10, 19, 21 or at a part connected to the coil support 10, 19, 21 and/or a projection 11, 14 or, respectively 28, 31 furnished at the coil support 10, 19, 21 or at a part connected to the coil support 10, 19, 21. Said recess 12 or, respectively, 30 and projection 11, 14 or, respectively 28, 31 can cooperate according to the kind of a snap and/or lock connection.

The invention arrangement can further include the closure part 4, 8 exhibiting, on its side disposed toward the coil support 10, 19, 21, tongue-shaped adjuncts 9 or, respectively, 33 running substantially parallel to the axis longitudinal of the cup-shaped casing part 1, 2, 22 extending over the coil support 10, 19, 21. Each of the adjuncts 9 or, respectively, 33 can exhibit at least one protrusion 13 or, respectively, 29 running perpendicular to the longitudinal axis of the adjuncts and extending in the direction toward the coil support 10, 19, 21. Projections 11, 14, 28, 31 and/or recesses 12, 30, running substantially perpendicular to the longitudinal axis of the coil support 10, 19, 21, can be furnished at the coil support 10, 19, 21. Said projections 11, 14, 28, 31 or recesses 12, 30 can coact and engage with the protrusions 13, 29 of the tongue-shaped adjuncts 9, 33 of the cable feed-through 4, 8 in the kind of a locking engagement. The projections and recesses can be delimited by rail-like parts 35 attached to the closure part 4, 8. Said rail like parts 35 can run parallel to the tongue-shaped adjuncts 9 or, respectively, 33. The rail-like parts 35 can serve as a guide 135 for the tongue-shaped adjuncts 9 or, respectively, 33. The rail-like parts 35 can be disposed at the coil support 4, 19, 21 in the region of the projections 11, 14 or, respectively, 28, 31 and recesses 12 or, respectively, 30.

Figure 1:
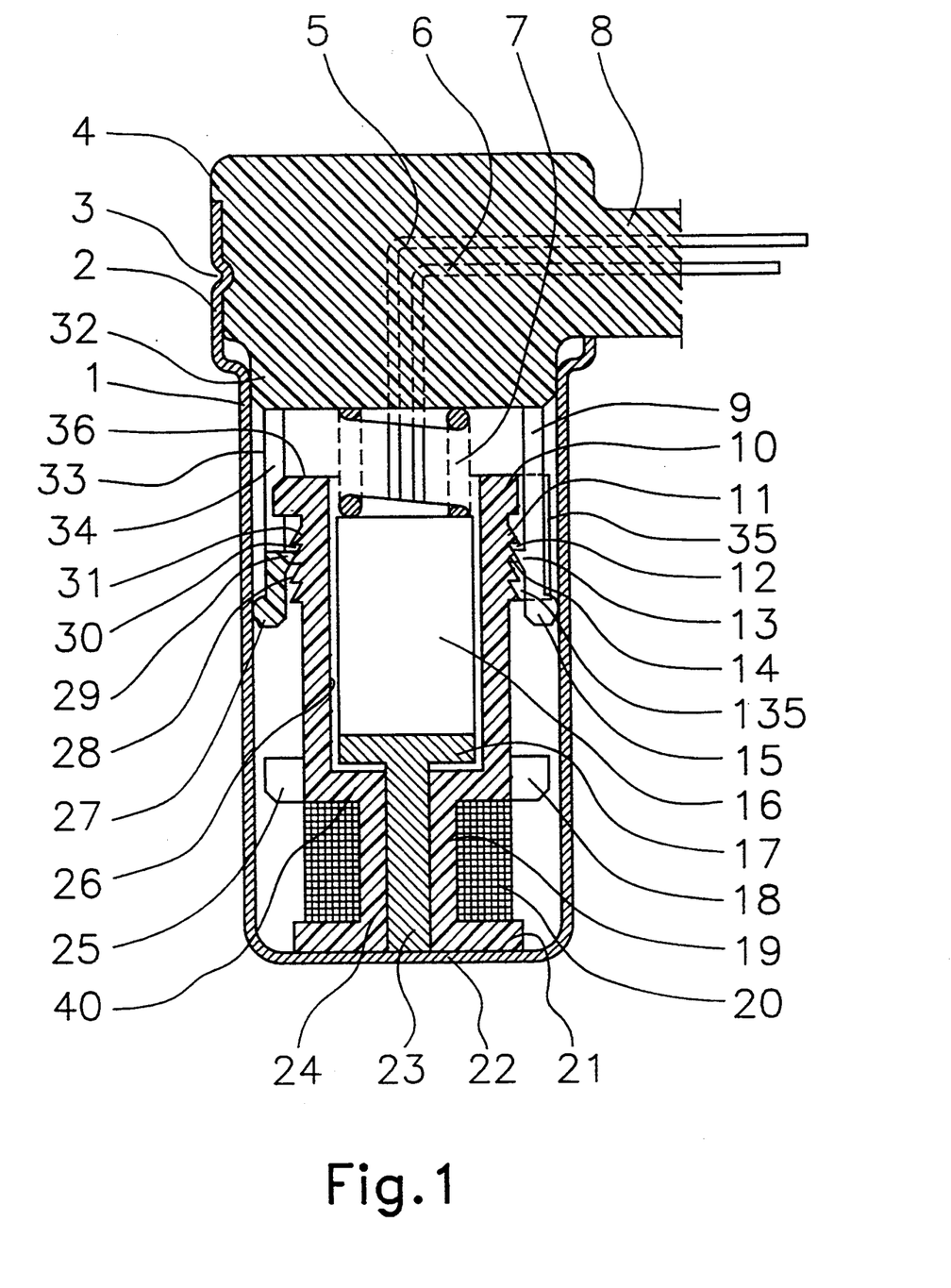
FIG. 1 shows a longitudinal sectional view of a pulse rotation speed sensor with a coil support and a closure part formed as a cable feed-through, where the coil support and the cable feed-through are connected to each other by way of a locking engagement.
Figure 2:
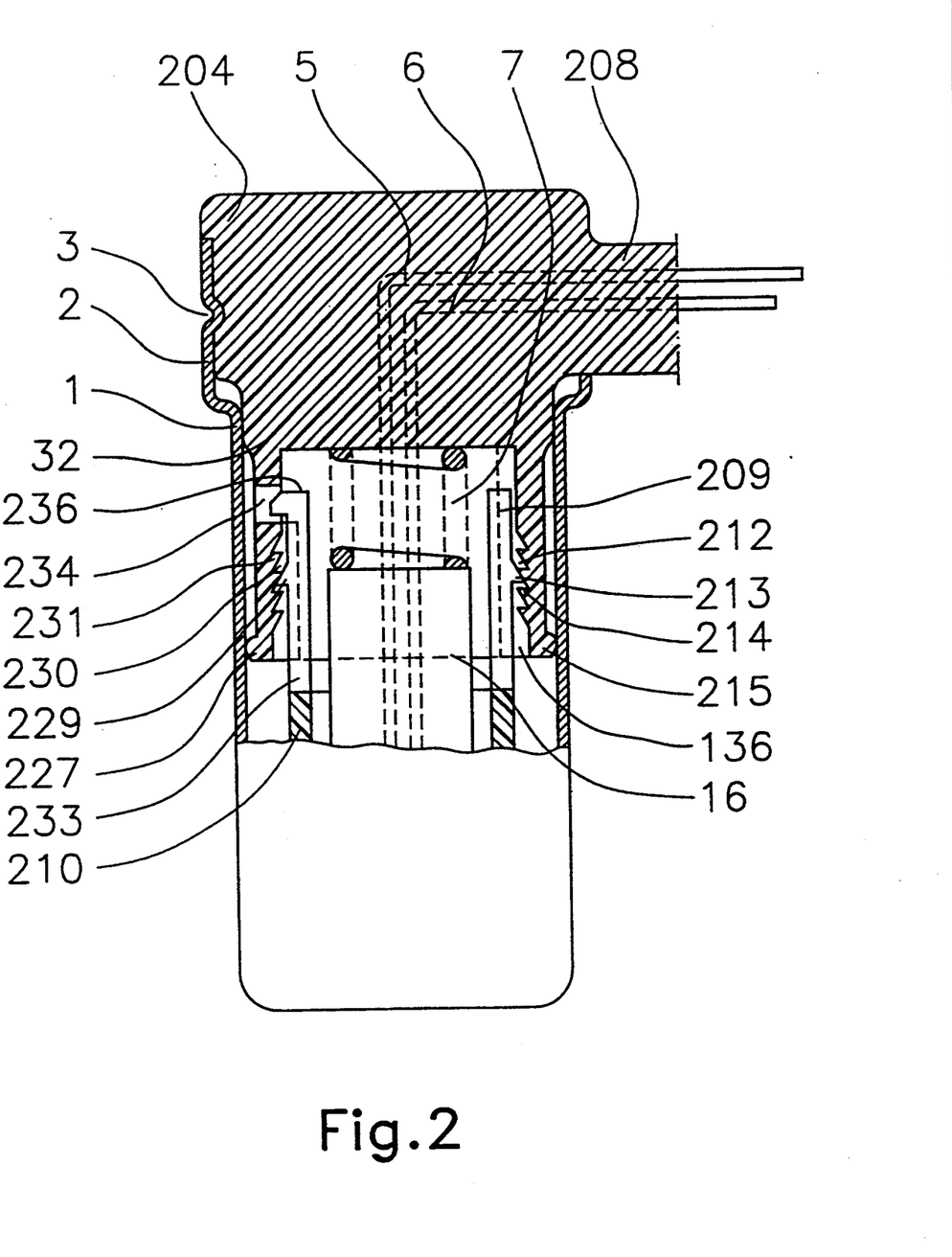
FIG. 2 shows a longitudinal sectional view of a second embodiment of a pulse rotation speed sensor.

The offshoot 236 ending the tongue-shaped adjunct 233 and the break-out 234 furnished at the closure part 204, 208 are shown in FIG. 2. An extension 215, 227 extends toward the wall of the casing and is disposed in the free end region of the closure part 204, 208 in the casing and this extension is comparable to the extension 15, 27 of FIG. 1.

Figure 3:
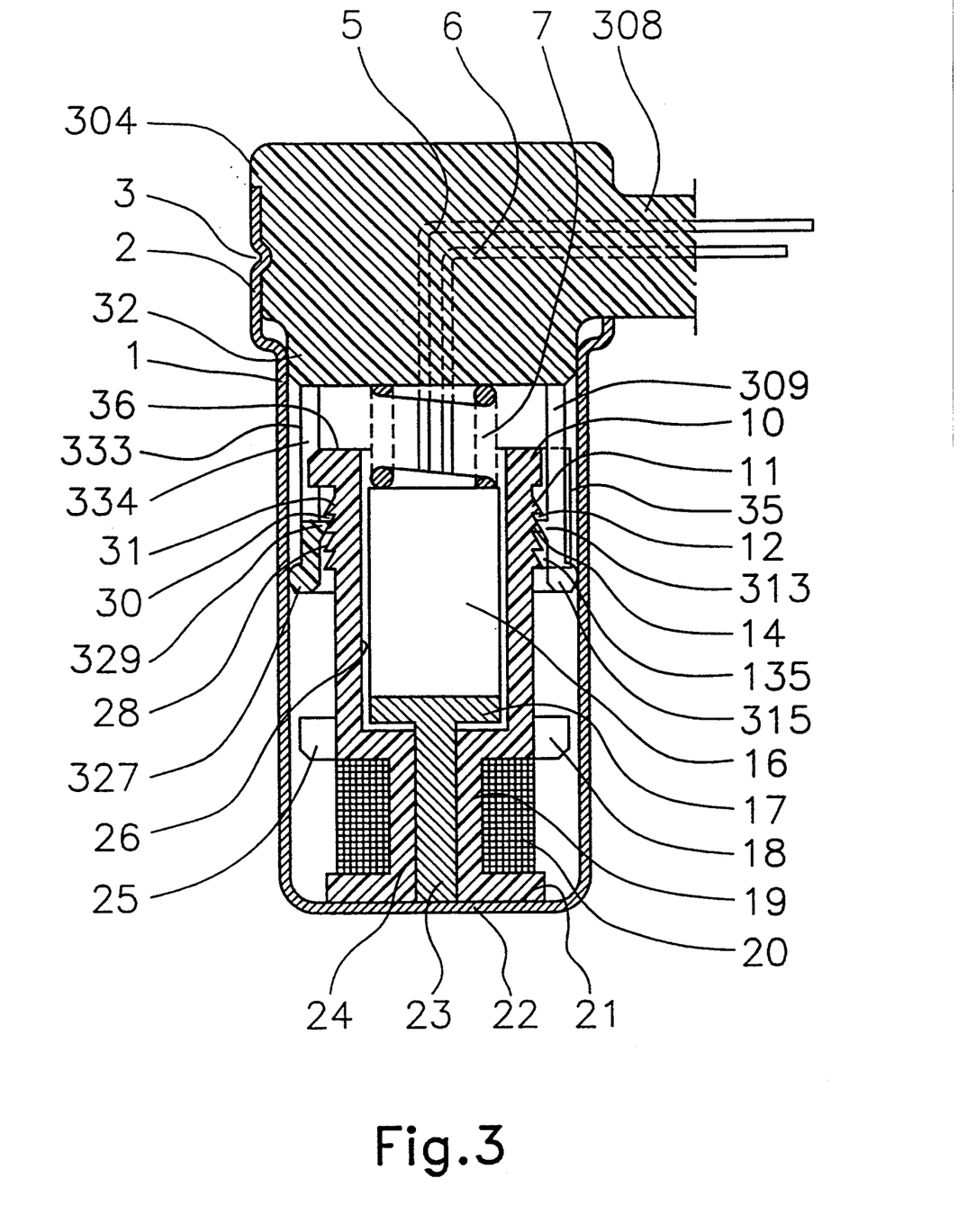
FIG. 3 shows a longitudinal sectional view of a third embodiment of a pulse rotation speed sensor.

FIG. 3 illustrates that adjuncts 309, 333 exhibiting the protrusions 313 and 329 and connected with the closure part 304, 308, is formed as a tubular-shaped body.

Figure 4:
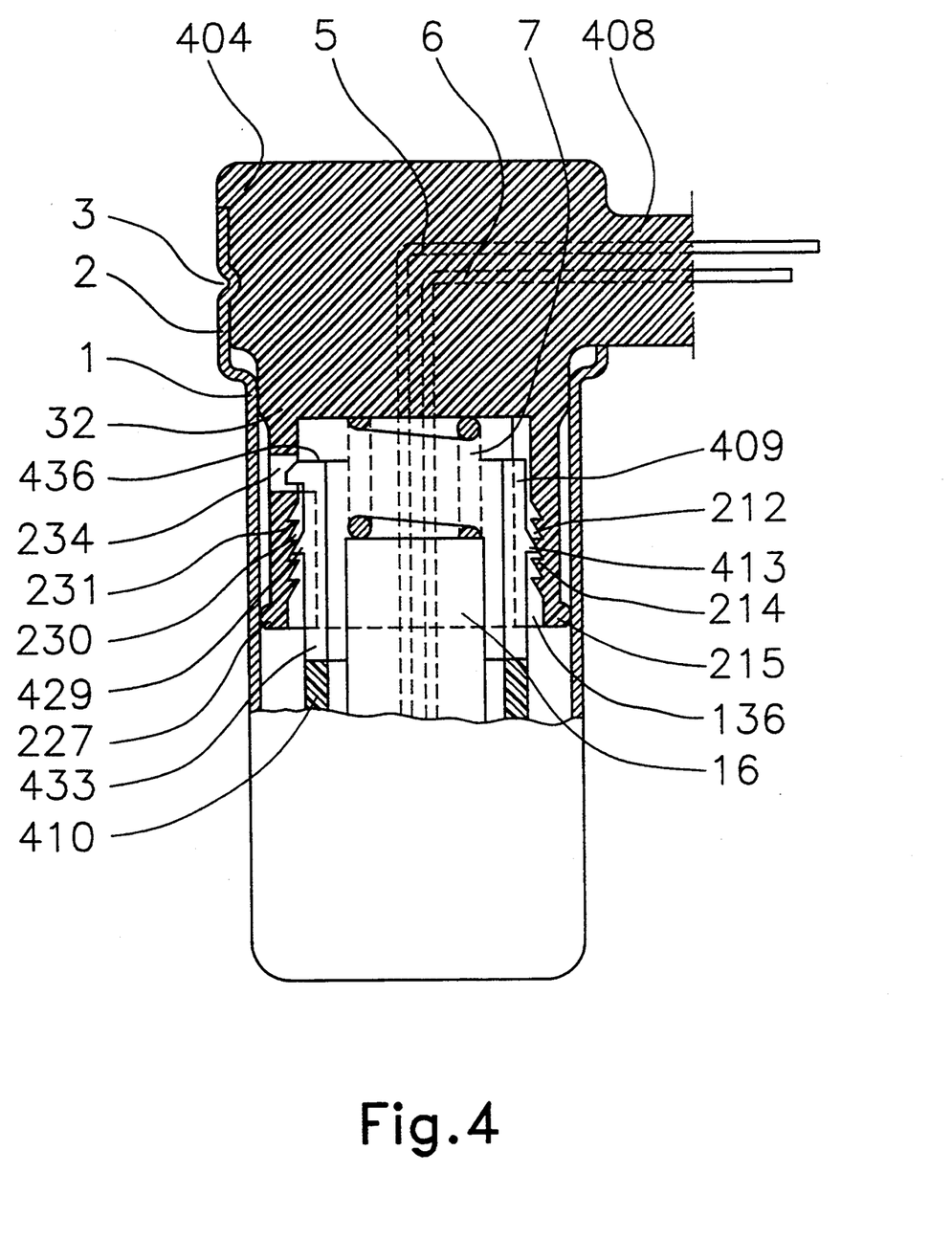
FIG. 4 shows a longitudinal sectional view of a fourth embodiment of a pulse rotation speed sensor.

FIG. 4 illustrates that the coil support 410 is also formed as a tubular-shaped part, where said tubular-shaped part exhibits the protrusions 413 and 429.

The coil support 210 can exhibit, on its side disposed toward the closure part 204, 208, tongue-shaped adjuncts 209, 233 extending toward the closure part 204, 208 and running in the guide 136 substantially parallel to the longitudinal axis of the cup-shaped casing part 1, 2. One of the adjuncts 209, 233 can exhibit an offshoot 236 running substantially perpendicular to the longitudinal axis of the adjuncts and extending in the direction of a part of the cable feed-through 204, 208. Projections 214, 231 and recesses 212, 230 can be furnished at the closure part 204, 208, running substantially perpendicular to the longitudinal axis of the closure part 204, 208. The projections 214, 231 and recesses 212, 230 can cooperate with and engage the protrusions 213, 229 at the tongue-shaped adjuncts 209, 233 of the coil support 210 in the kind of a locking engagement. The cable feed-through 204, 208 can exhibit a breakout 234. An offshoot 236, provided at the coil support 210 engages into said breakout 234. Said projections 214, 231 and recesses 212, 230 can also cooperate with and engage the interlocking toothing 214, 231 of the coil support 210 in the kind of a locking engagement. The closure part 204, 208 can exhibit on its side, disposed toward the inner wall of the cup-shaped casing part 1, 2 an extension 215 or, respectively, 227. Said extension can rest under pretensioning at the inner wall of the cup-shaped casing part 1, 2.

An elastic element 7 can be provided and supported at the closure part 4, 8 or respectively 204, 208 or 304, 308 or 404, 408. Said elastic element can apply force at a permanent magnet 16, disposed in the coil support 10, 19, 21 or respectively 210, 410, as well as at a pole pin 17, 23, connected to the permanent magnet 16, in the direction of the floor 22 of the cup-shaped casing part 1, 2, 22. The elastic element 7 can be formed by a spring.

The retaining means for a force-matching connection of the closure part 4, 8 or respectively 204, 208 or 304, 308 or 404, 408 and of the coil support 10, 19, 21 or respectively 210, 410 can be formed by a recess, provided in each case at one device part, coil support 10, 19, 21 or respectively 210, 410 or closure part 4, 8 or respectively 204, 208 or 304, 308 or 404, 408, and one projection, provided in each case at the other device part, closure part 4, 8 or respectively 204, 208 or 304, 308 or 404, 408 or coil support 10, 19, 21 or respectively 210, 410. Said recess and projection can coact in the kind of a snap and lock connection.

The retaining means for the force-matching connection of the closure part 4, 8 or respectively 204, 208 or 304, 308 or 404, 408 and of the coil support 10, 19, 21 or respectively 210, 410 can further be formed by a tubular body, defining, respectively a first device part or a corresponding second device part, and disposed in each case at a first one of these two device parts, and by a protrusion 13, 29 or respectively 213, 229 or 313, 329 or 413, 429 disposed in each case at a second one of these two device parts. Said protrusion can engage the tubular part by way of a kind of friction-matching plug connection.

The retaining means for the force-matching connection of the closure part 4, 8 or respectively 204, 208 or 304, 308 or 404, 408 and the coil support 10, 19, 21 or respectively 210, 410 can also be formed by clamping elements, disposed in each case at one device part, closure part 4, 8 or respectively 204, 208 or 304, 308 or 404, 408, or coil support 10, 19, 21 or respectively 210, 410. The clamping elements can in each case engage a second device part, i.e. coil support 10, 19, 21 or respectively 210, 410, or closure part 4, 8 or respectively 204, 208 or 304, 308 or 404, 408. The closure part 4, 8 or respectively 204, 208 or 304, 308 or 404, 408 can be formed as a cable feed-through for a cable 5, 6 connecting the electrical device parts 20, disposed in the casing 1, 2, 22, with the electrical device part, disposed outside of the casing 1, 2, 22.

The pulse tacho-generator illustrated in the drawing includes a casing Said casing is composed out of a cup-shaped casing part 1, 2, 22 and a closure part 4, 8 or respectively 204, 208 or 304, 308 or 404, 408, serving as a cable feed-through for the cup-shaped casing part 1, 2, 22. The cup-shaped casing part 1, 2, 22 is furnished with a floor 22 and exhibits an extended region 2 on the side disposed remote to its floor 22. The extended region 2 serves for accepting and receiving the cable feed-through 4, 8 or respectively 204, 208 or 304, 308 or 404, 408.

A tube-shaped stepped 40 coil support 10, 19, 21 or respectively 210, 410 is disposed in the cup-shaped casing part 1, 2, 22. The coil support 10, 19, 21 or respectively 210, 410 is furnished at its end disposed toward the floor 22 of the cup-shaped casing part 1, 2, 22 or respectively 210, 410, with a radially outwardly extending flange collar 21. A coil winding 20 is disposed on the support section 19 exhibiting a smaller outer cross-section of the coil support 10, 19, 21 or respectively 210, 410 and surrounding the section 19 of the coil support 10, 19, 21 or respectively 210, 410 between a step 40 and the surrounding flange collar 21.

A stepped pole pin 17, 23 and a permanent magnet 16 are disposed such in a tube-shaped coil support 10, 19, 21 or respectively 210, 410, that the pole pin 17, 23 rests with its front face, exhibiting a smaller cross-section, at the floor 22 of the cup-shaped casing part 1, 2, 22. The permanent magnet 16 is disposed at the side of the pole pin 17, 23 remote from the floor 22 of the cup-shaped casing part 1, 2, 22, and the permanent magnet 16 is in close contact with the pole pin 17, 23.

Two attachment protrusions 18 and 25 are disposed at equal distance relative to each other on the circumference of the coil support 10, 19, 21 or respectively 210, 410. Said attachment protrusions 18 and 25 run perpendicular to the longitudinal axis of the coil support 10, 19, 21 or respectively 210, 410. The attachment protrusions 18 and 25 are dimensioned such that there is only a minimal space between said protrusions and the inner wall of the casing part 1, 22. The attachment protrusions 18, 25 can perform the function of space-determining means between the coil support 10, 19, 21 or respectively 210, 410 and the casing wall.

A cable feed-through 4, 8 or respectively 204, 208 for the cup-shaped casing part 1, 2, 22, serving as a closure part, is inserted in the expanded region 2 of the cup-shaped casing part 1, 2, 22. The cable feed-through 4, 8 or respectively 204, 208 exhibits an extension 32 on the side disposed toward the coil support 10, 19, 21 or respectively 210, 410.

Two tongue-shaped adjuncts 9 and 33, disposed opposite to each other, are furnished at the extension 32 of the cable feed-through 4, 8. Said tongue-shaped adjuncts 9 and 33 extend in the direction toward the coil support 10, 19, 21 and run substantially parallel to the longitudinal axis of the coil support 10, 19, 21. The tongue-shaped adjuncts 9 and 33 of the cable feed-through 4, 8 are disposed such that they rest between the inner wall of the cup-shaped casing part 1, 2, 22 and the coil support 10, 19, 21.

Each of the two tongue-shaped adjuncts 9 or, respectively, 33, exhibits at least one nose-shaped protrusion 13 or, respectively, 29, which is directed in the direction toward the jacket face of the coil support 10, 19, 21.

The coil support 10, 19, 21 exhibits on its jacket face, in the region of the tongue-shaped adjuncts 9, 33, a projection 11, 14 or, respectively, 28, 31 and recesses 12 or, respectively, 30 of the kind of an interlocking toothing.

The nose-shaped protrusions 13 or, respectively, 29 of the tongue-shaped adjuncts 9, 33 of the cable feed-through 4, 8 are engaging the interlocking toothing 11, 14, 12 or, respectively 28, 31, 30 of the coil support 10, 19, 21. The teeth of the interlocking toothing 11, 14, 12 or, respectively, 28, 31, 30 are formed such that, in each case, a tooth flank of one tooth is running downwardly at an inclined angle in the direction toward the floor 22 of the casing part 1, 22 and that, in each case, the other tooth flank of the same tooth is disposed substantially perpendicular to the longitudinal axis of the coil support 10, 19, 21.

Radially outwardly extending extensions 15 or, respectively, 27 are disposed at the free ends of the tongue-shaped adjuncts 9 or, respectively 33 of the cable feed-through 4, 8. Said extensions 15, 27 rest under pretensioning at the inner side of the cup-shaped formed casing part 1, 2, 22. The extensions 15, 27 at the tongue-shaped adjuncts 9, 33 do not have to be disposed at the free ends of the adjuncts 9, 33. The extensions 15, 27 can also be disposed at different locations outside of the region of the nose-shaped protrusions 13 or, respectively, 29.

Each of the nose-shaped protrusions 13 or, respectively 29 and each projection of the interlocking toothing 11, 14, 28, 31 of the coil support 10, 19, 21 exhibits a guiding, bevelled inclination which facilitates the tongue-shaped adjuncts 9, 33 with their nose-shaped protrusions 13, 29 the passage of the interlocking toothing 11, 14, 28, 31 of the coil support 10, 19, 21 upon joining and fitting together of the cable feed-through 4, 8 and the coil support 10, 19, 21.

Similarly, the cable feed-through 204, 208 or respectively 404, 408 can exhibit an interlocking toothing 214, 231 instead of the nose-shaped protrusions.

In reverse, the coil support 210, 410 can be furnished with nose-shaped protrusions 213, 229 or respectively 413, 429 instead of an interlocking toothing.

Rail-like parts 35 are formed at the coil support 10, 19, 21 in the region of the interlocking toothing 11, 14 on the two sides of the tongue-shaped adjuncts 9 or, respectively, 309, for guiding the tongue-shaped adjuncts 9, or, respectively 309, where the rail-like parts 35 are running in the direction of the longitudinal axis of the coil support 10, 19, 21. The rail-like parts 35 are formed such that they form together with the interlocking toothing 11, 14, a U profile open toward the inner wall of the cup-shaped casing part 1, 2, 22, wherein the groove base of this U profile forms the interlocking toothing 11, 14.

A different kind of guiding is provided on the tongue-shaped adjuncts 33, or, respectively 333.

The tongue-shaped adjuncts 33, or, respectively 333 exhibits a breakout 34 or, respectively 334 into which an offshoot 36 extends. The offshoot 36 is formed on the side of the coil support 10, 19, 21 disposed toward the cable feed through 4, 8 or, respectively, 304, 308. The offshoot 36 extends radially outwardly in the direction of the tongue-shaped adjuncts 33, or, respectively 333. The breakout 34, or respectively 334 in the tongue-shaped adjunct 33 or, respectively 333 is dimensioned in the direction of its longitudinal axis such that there is room for play in axial direction between the coil support 10, 19, 21 and the cable feed-through 4, 8 or, respectively 304, 308 before the protrusion 29 or, respectively 329 of the tongue-shaped adjunct 33 or, respectively 333 engages into the interlocking toothing 28, 31 of the coil support 10, 19, 21.

It is understood that always two uniform guides are selected as desirable structures for the tongue-shaped adjuncts 9, 33 or, respectively, 209, 333.

The slot provided in the tongue-shaped adjuncts 33 or respectively, 333, furnishes the advantage that the coil support 10, 19, 21 and the cable feed-through 4, 8 or respectively, 304, 308, are connected to each other even when the nose-shaped protrusions 29 or, respectively, 329, of the tongue-shaped adjuncts 33 or, respectively, 333 of the cable feed-through 4, 8 or, respectively, 304, 308, are not engaging with the interlocking toothing 28, 31 of the coil support 10, 19, 21.

An elastic element formed as a spring 7 is disposed between the sides of the coil support 10, 19, 21 or, respectively, 210, 410, facing each other, and the extension 32 of the cable feed-through 4, 8 or, respectively, 204, 208 or 304, 308 or 404, 408. The spring 7 is supported with its one end at an extension 32 and loads with its other end the permanent magnet 16 disposed in the coil support 10, 19, 21 or, respectively 210, 410. Since the permanent magnet 16 rests at the soft magnetic pole pin 17, 23, this permanent magnet 16, with its front face disposed toward the floor 22 of the cup-shaped casing part 1, 2, 22, is held in position with the pole pin 17, 23.

The cable feed-through 4, 8 or, respectively, 204, 208 or 304, 308 or 404, 408 furnishes a passage way for two cables 5, 6 or, respectively, for the conductors of a cable, by way of which the coil 20 can be connected to an electrical construction device part disposed outside of the casing part 1, 2, 22 and outside of the cable feed-through 4, 8 of the pulse tacho-generator.

The tongue-shape adjuncts can of course also be disposed at the coil support 210 or, respectively, 410 in such a way that they extend in the direction toward the cable feed-through 204, 208 or, respectively 404, 408. In such an embodiment, the extension 32 of the cable feed-through 204, 208 or respectively 404, 408 would have to be extended in the direction of the coil support 210 or, respectively, 410 and would exhibit a cross-section which would allow to pass the tongue-shaped adjuncts 209, 233 or, respectively, 409, 433 on the outside of the extension 32.

It is also possible to furnish the coil support 10, 19, 21 or the cable feed-through 4, 8 or, respectively, 204, 208 or 304, 308 or 404, 408 with recesses disposed in the direction of their longitudinal axis, where the tongue-shaped adjuncts 9, 33 or 209, 233 or 309, 333 or 409, 433 adjoining at the respective other part, the cable feed-through 4, 8 or, respectively 204, 208 or 304, 308 or 404, 408 or the coil support 10, 19, 21 or, respectively, 210, 410, immerse in said recesses. The walls delimiting these recesses have then to exhibit projections and recesses or breakouts running perpendicular to the longitudinal axis of the recesses, into which recesses or break-outs the protrusions disposed at the tongue-shaped adjuncts can engage. The tongue-shaped adjuncts 9, 33 or respectively 209, 233 or 309, 333 or 409, 433 do not necessarily have to be formed at the cable feed-through 4, 8 or, respectively 204, 208 or 304, 308 or 404, 408 or at the coil support 10, 19, 21 or, respectively 210, 410 but they can alternatively be attached with attachment means.

Instead of the tongue-shaped adjuncts, there can also be furnished a tube-shaped body formed with slots in the direction of its longitudinal axis. A body provided at the respective other part, coil support or cable feed-through, or a part of the coil support or, respectively, a part of the cable feed-through immerses into the tube-shaped body. Of course, the tube-shaped body must then be connected with one of the two parts, cable feed-through or coil support.

The elastic element between the cable feed-through and the permanent magnet can of course also be supported at a part connected to the permanent magnet such as, for example, at a magnetic return plate.

The projections and recesses serving for the snap and lock connection can be furnished at or formed onto the adjuncts of the coil support 10, 19, 21 and of the cable feed-through 204, 208 or, respectively, 404, 408 or can also be furnished directly at these recited device parts.

The mounting and assembly of the above-described pulse tacho-generator is illustrated in more detail in the following.

The cables 5, 6 are inserted or, respectively, pressed into the recess of the cable feed-through 4, 8 or, respectively, 304, 308 before the insertion of the coil support 10, 19, 21 into the cup-shaped casing part 1, 2, 22. The soft magnetic iron pole pin 17, 23 and the permanent magnet 16 are successively inserted into the step-wise formed inner space 24, 26 of the tube-shaped coil support 10, 19, 21. Subsequently, the spring 7 is inserted into the free space between the tongue-shaped adjuncts 9, 33 or respectively, 309, 333 of the extension 32 of the cable feed-through 4, 8 or 304, 308 such that they come to rest with their one end at the extension 32 of the cable feed through 4, 8 or, respectively, 304, 308. The cable feed-through 4, 8 or respectively, 304, 308 is then shifted with its tongue-shaped adjuncts 9, 33 or, respectively, 309, 333 onto the part of the coil support 10,. 19, 21 exhibiting the interlocking toothing 11, 14, 28, 31 and in fact so far until the nose-shaped protrusions 13, 29 or, respectively, 313, 329 of the tongue-shaped adjuncts 9, 33 or, respectively, 309, 333 of the cable feed-through 4, 8 or, respectively, 304, 308 snap into the tooth gaps or recesses 12, 30 of the interlocking toothing of the coil support 10, 19, 21.

The process of the joining of the cable feed through 4, 8 and of the coil support 10, 19, 21 is facilitated by providing guiding inclinations at the projections 11, 14, 28, 31 of the coil support 10, 19, 21 forming the interlocking toothing, by way of which guiding inclinations the tongue-shaped adjuncts 9, 33 of the cable feed-through 4, 8 are spread outwardly and are elastically deformed upon the plugging-together process of the cable feed-through 4, 8 and of the coil support 10, 19, 21.

The cable feed-through 4, 8 and the coil support 10, 19, 21 are now loaded by the spring 7, disposed between these two device parts, which spring 7, on the one hand, rests at the extension 32 of the cable feed-through 4, 8 and, on the other hand, at the permanent magnet 16, in such a way that the cable feed-through 4, 8 and the coil support 10, 19, 21 tend to move apart from each other.

The coil support 10, 19, 21 and the cable feed-through 4, 8 are held together under pretensioning and form a construction unit based on the interlocking toothing 11, 14, 28, 31 of the coil support 10, 19, 21 and the locking engagement formed with the protrusions 13, 29 of the tongue-shaped adjuncts 9, 33 of the cable feed-through 4, 8 as well as based on the spring 7. The protrusions 13, 29 at the tongue-shaped adjuncts 9, 33 exhibit on their side disposed toward the extension 32 of the cable feed-through 4, 8 a planar face running parallel relative to the side of the extension 32. The interlocking toothing 11, 14, 28, 31 exhibits on its side, disposed toward the planar face of the protrusions 13, 29, also a planar face running parallel to this side of the extension 32 of the cable feed-through 4, 9. Based on this step, it is achieved that, upon a motion between coil support 10, 19, 21 and the cable feed-through 4, 8 away from each other, there occurs a blocking action.

The conductors of the cable 5, 6 and the wires of the coil 20 are now soldered together.

The thus preassembled and premounted device unit, with the cable feed-through 4, 8 and the coil support 10, 19, 21, is now inserted into the cup-shaped casing part 1, 2, 22, wherein the pole pin 17, 23 comes to rest with its front face, disposed toward the floor 22 of the cup-shaped casing part 1, 2, 22, at this floor 22. The cable feed-through 4, 8 is now inserted so far into the cup-shaped casing part 1, 2, 22 until it rests with its cover-like part of the feed-through 4 at the edge of the cup-shaped casing part 1, 2, 22.

During this process, the cable feed-through 4, 8 is further shifted onto the coil support 10, 19, 21, wherein the front face 21 of the coil support 10, 19, 21, disposed toward the floor 22 of the casing 1, 2, 22, comes to rest at the floor 22 of the casing 1, 2, 22. The protrusions 13, 29 furnished at the tongue-shaped adjuncts 9, 33, are further in engagement with projections and recesses, formed like an interlocking toothing 11, 14, 28, 31, of the coil support 10, 19, 21, thus form a locking engagement between the coil support 10, 19, 21 and the cable feed-through 4, 8.

Since the protrusions 13, 29 of the cable feedthrough 4, 8 do not always rest precisely in the corresponding recesses 12, 30 of the interlocking toothing 11, 14, 28, 31 of the coil support 10, 19, 21, the tongue-shaped adjuncts 9, 33 are pressed perpendicular to the longitudinal axis of the coil support 10, 19, 21 in outward direction and rest with their extensions 15, 27, disposed at their outside, under pretension at the inner wall of the cup-shaped casing part 1, 2, 22.

It is achieved with the above-described means that the coil support 10, 19, 21 is fixed, both in the direction of its longitudinal axis as well as perpendicular to its longitudinal axis, in the cup-shaped casing part 1, 2, 22.

The cup-shaped casing part 1, 2, 22 and the cable feed-through 4, 8, are connected to each other with suitable means. This can be performed, for example, by crimping, and forming a bead 3, at certain locations at the wall of the cup shaped casing part 1, 2, 22 into corresponding recesses of the outer jacket face of the cable feed-through 4, 8.

If the tongue-shaped adjunct 33 is furnished with a breakout 34, running in the direction of its longitudinal axis, as illustrated on the left-hand side of the drawing, the offshoot 36 of the coil support 10, 19, 21 snaps into the breakout 34 upon plugging together of coil support 10, 19, 21 and cable feed-through 4, 8. The breakout 34 exhibits a larger axial extension than the offshoot 36 of the coil support 10, 19, 21. The breakout 34, in the tongue-shaped adjunct 33, and possibly also in the tongue-shaped adjunct 9 of the cable feed-through 4, 8, forms together with the offshoot 36 at the coil support 10, 19, 21 an axially slidable connection between the coil support 10, 19, 21 and the cable feed-through 4, 8. This connection is formed such that it becomes already effective when the interlocking toothing 11, 14, 28, 31 of the coil support 10, 19, 21 and the protrusions 13, 29 of the tongue-shaped adjuncts 9, 33 of the cable feed-through 4, 8 are not yet in engagement relative to each other. The breakout 34 in the tongue-shaped adjuncts 33 and the offshoot 36 at the coil support 10, 19, 21 are dimensioned such that they serve as a safety measure against rotary shifting for the coil support 10, 19, 21.

The device for positional fixation of the coil support is of course not bound to the embodiment described.

Instead of the cylindrical spring, other kinds of springs, such as for example conical springs or a barrel-shaped spring can be employed. Also springingly formed protrusions can be disposed at the cable feed-through, which springingly formed protrusions are supported at the permanent magnet or at the core. The tongue-shaped adjuncts can be disposed both at the cable feed-through as well as at the coil support. Correspondingly, the nose-shaped protrusions can be furnished both at the coil support as well as at the cable feed-through 4, 8.

In the same way, the interlocking toothing 214, 231 can be attached at the cable feed-through 204, 208 or, respectively, 404, 408 instead of at the coil support 10, 19, 21.

Instead of the tongue-shaped adjuncts at the cable feed-through, a tube-shaped part with projections and recesses or, respectively with breakouts or offshoots can be furnished at the cable feed-through. In each case, the other part, such as a part of the coil support, is inserted into the tubular part. The tubular part would have to be furnished with a longitudinal slot in order to allow an elastic deformation of tubular part, such as a widening, during the process of the joining together of coil support and cable feed-through 204, 208.

The means serving as snap and lock connection, such as the tongue-shaped adjuncts at the cable feed-through 4, 8 adjuncts with protrusions at the coil support, can be made of any desired materials, such as, for example, plastic or metal.

The shape-matching connection between the coil support and the closure part, formed as an interlocking toothing, can be substituted by a kind of frictionally engaged connection furnishing a form-transmitting connection.

For this purpose, in each case, one device part, coil support or closure part, is furnished with a breakout or recess, running in the direction of its longitudinal axis, or with a tubular body or with clamping elements. In each case, the other device part, closure part or coil support, or a part attached at one of these device parts, is formed such and dimensioned such that it can be partly or fully surrounded by the recess or by the tubular body or by the clamping elements such that a relative motion between the two device parts is possible only upon overcoming of the friction force between these parts.

The statement that the coil support is to be engaged and has to be applied by the closure part with a pretension in the direction of the floor of the cup-shaped casing part means that the coil support is maintained resting at the floor of the cup-shaped casing part, wherein the value of the pretension can approach a value of zero.

The diameter of the permanent magnet 16 can be from about 3 to 4 times the diameter of the pole pin 17, 23 plunged into the center of the coil support 10, 19, 21 or, respectively, 210, or 410 surrounded by the coils 20. The inner diameter of the coils 20 can be from about 1.5 to 2.5 times the outer diameter of the pole pin 17, 23 inside the coils 20. The total length of the soft magnetic pole pin 17, 23 can be from about 0.5 to 2 times, and preferably from 0.9 to 1.1 times, the length of the permanent magnet 16. Preferably, the end of the pole pin 17, 23 toward the feed-through 4, 8 or, respectively, 204, 208 or 304, 308 or 404, 408 extends by about 0.1 to 0.15 of the total length of the pole pin 17, 23 at the width of the permanent magnet 16 for providing a better collection of the magnetic flux from the permanent magnet 16 into the pole pin 17, 23. The length of the coil 20 itself is preferably from about 0.4 to 0.6 times the total length of the pole pin 17, 23. The thickness of the wall facing the pole pin 17, 23 is preferably from about 0.02 to 0.1 times the total length of the pole pin 17, 23 and preferably from about 0.04 to 0.06 the length of the pole pin 17, 23. The permanent magnet 16 preferably has a rotation cylindrical shape as does the pole pin 23 in the upper area of the pole pin 17. The diameter of the cup can be 1.5 to 3 times, and preferably 2 to 2.5 times, the diameter of the permanent magnet 16. The height of the protrusion of the coil support can be from about 0.3 to 0.5 times the thickness of the coil support. The coil support preferably extends to a level above the permanent magnet 16, and such extension above the upper level of the permanent magnet 16 can be from about 1 to 2 times the thickness of the coil support 10, 19, 21 or, respectively, 210, 410. The cup-shaped casing part 1, 2, 22, preferably engages the feed-through 4, 8 or, respectively, 204, 208 or 304, 308 or 404, 408 sealingly in order to avoid a contamination and corrosion of the parts inside the casing.

Under ideal conditions, there is provided a gap in axial direction between the step of the pole pin 23 and the step of the coil support 10, 19, 21 or, respectively, 210, 410, which can be from about 0.02 to 0.05 of the total length of the pole pin 23. This gap allows the adjustment of the pole pin 23 by way of the spring 7 such that the pole pin 23 can rest at the floor 22 of the cup-shaped casing 1. Similarly, in order to allow a free motion and full force-transmission of the spring 7 to the pole pin 23, there is furnished an annular gap of from about 0.1 to 0.2 times the diameter of the permanent magnet 16, between the outer wall of the permanent magnet 16 and the inner wall of the coil support to allow a motion of the permanent magnet based on the force exerted by the spring 7. It is necessary that the permanent magnet and the pole pin are aligned such as to match the spacings between permanent magnet and inner wall of the coil support in order to avoid a canting and a locking of the permanent magnet inside of the coil support.

The extension preferably has at its end toward the coil a dimension which matches the inner dimension of the cup. Preferably, the extension expands then to a diameter which is from about 5 to 15% larger than the inner diameter of the cup. The cup is further expanded at its upper part to match this dimension.

It will be understood that each of the elements described above, or two or more together, may also find a useful application in other types of positioning devices or coil supports differing from the types described above.

While the invention has been illustrated and described as embodied in the context of an arrangement of a coil supported in a cup-shaped formed casing part, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement of a coil supported in a cup-shaped formed casing part comprising
a coil support for supporting a coil;
a cup-shaped casing part having a floor;
a closure part disposed on the side of the coil support remote relative to the floor of the cup-shaped casing part, wherein the closure part is attached to the cup-shaped casing part;
retaining means disposed at oppositely disposed surfaces of the closure part and of the coil support, wherein the retaining means is formed to transmit a clamping tension exerted by the coil support in the direction toward the floor of the cup-shaped casing part after application of the closure part to the coil support, wherein the retaining means are formed as matchingly engaging mechanical structures of a protrusion associated with the closure part and of a recess furnished in association with the coil support, which recess and protrusion cooperate as a snap and lock connection.

2. An arrangement of a coil supported in a cup-shaped formed casing part comprising
a coil support;
a cup-shaped casing part having a floor supporting a pulse tacho-generator;
a closure part disposed on the side of the coil support remote relative to the floor of the cup-shaped casing part, wherein the closure part is attached to the cup-shaped casing part;
retaining means disposed at oppositely disposed surfaces of the closure part and of the coil support, wherein the retaining means is formed to transmit a clamping tension exerted by the coil support in the direction toward the floor of the cup-shaped casing part after application of the closure part to the coil support.

3. An arrangement of a coil supported in a cup-shaped formed casing part for forming a pulse tacho-generator comprising a casing support;
a cup-shaped casing part having a floor;
a closure part disposed on the side of the coil support remote relative to the floor of the cup-shaped casing part, wherein the closure part is attached to the cup-shaped casing part;
retaining means disposed at oppositely disposed surfaces of the closure part and of the coil support, wherein the retaining means is formed to transmit a clamping tension exerted by the coil support in the direction toward the floor of the cup-shaped casing part after application of the closure part to the coil support,
wherein the retaining means are formed as matching engaging mechanical structures of a protrusion associated with the closure part and of a recess furnished in association with the coil support, which recess and protrusion cooperate as a snap and lock connection.

4. An arrangement of a coil supported in a cup-shaped formed casing part comprising
a coil support;
a cup-shaped casing part having a floor;
a closure part disposed on the side of the coil support remote relative to the floor of the cup-shaped casing part, wherein the closure part is attached to the cup-shaped casing part;
retaining means disposed at oppositely disposed surfaces of the closure part and of the coil support, wherein the retaining means is formed to transmit a clamping tension exerted by the coil support in the direction toward the floor of the cup-shaped casing part after application of the closure part to the coil support, wherein the retaining means are formed as matchingly engaging mechanical structures of a recess associated with the closure part and of a protrusion furnished in association with the coil support, which recess and protrusion cooperate as a snap and lock connection.

5. An arrangement of a coil supported in a cup-shaped formed casing part comprising a coil support;
a cup-shaped casing part having a floor;

a closure part disposed on the side of the coil support remote relative to the floor of the cup-shaped casing part, wherein the closure part is attached to the cup-shaped casing part;

retaining means disposed at oppositely disposed surfaces of the closure part and of the coil support, wherein the retaining means is formed to transmit a clamping tension exerted by the coil support in the direction toward the floor of the cup-shaped casing part after application of the closure part to the coil support for furnishing a connection of the closure part to the coil support; further comprising tongue-shaped adjuncts attached to the closure part on the side of the closure part disposed toward the coil support, wherein the tongue-shaped adjuncts are running substantially parallel to a longitudinal axis of the cup-shaped casing part, and wherein the tongue-shaped adjuncts extend over part of the coil support;

a protrusion located at the tongue-shaped adjunct, said protrusion running perpendicular to a longitudinal axis of the tongue-shaped adjuncts and extending in the direction toward the coil support;

an engagement means aligned substantially perpendicular to the longitudinal axis of the coil support and furnished at the coil support, which engagement means coacts and engages with the protrusion of the tongue-shaped adjuncts of the closure part as a locking engagement.

6. An arrangement of a coil supported in a cup-shaped formed casing part comprising a coil support;

a cup-shaped casing part having a floor;

a closure part disposed on the side of the coil support remote relative to the floor of the cup-shaped casing part, wherein the closure part is attached to the cup-shaped casing part; retaining means disposed at oppositely disposed surfaces of the closure part and of the coil support, wherein the retaining means is formed to transmit a clamping tension exerted by the coil support in the direction toward the floor of the cup-shaped casing part after application of the closure part to the coil support for furnishing a connection of the closure part to the coil support;

tongue-shaped adjuncts disposed on the coil support on the side of the coil support disposed toward the closure part, said tongue-shaped adjuncts extending toward the closure part and aligned substantially parallel to a longitudinal axis of the cup-shaped casing part;

a protrusion furnished at each of the tongue-shaped adjuncts, wherein said protrusion is aligned substantially perpendicular to a longitudinal axis of the tongue-shaped adjuncts and wherein the protrusion extends in the direction of a part of the closure part;

projections and recesses furnished at the closure part, said projections and recesses running substantially perpendicular to the longitudinal axis of the closure part, which projections and recesses cooperate with and engage the protrusion at the tongue-shaped adjuncts of the coil support as a 7. An arrangement of a coil supported in a cup-shaped formed casing part comprising a coil support;

a cup-shaped casing part having a floor;

a closure part disposed on the side of the coil support remote relative to the floor of the cup-shaped casing part, wherein the closure part is attached to the cup-shaped casing part;

retaining means disposed at oppositely disposed surfaces of the closure part and of the coil support, wherein the retaining means is formed to transmit a clamping tension exerted by the coil support in the direction toward the floor of the cup-shaped casing part after application of the closure part to the coil support for furnishing a connection of the closure part to the coil support and wherein the retaining means includes:

tongue-shaped adjuncts attached to the closure part for engaging the coil support, wherein the tongue-shaped adjuncts are disposed on the side of the closure part toward the coil support, and wherein the tongue-shaped adjuncts extend from the closure part and are running substantially parallel to a longitudinal axis of the cup-shaped casing part;

a protrusion furnished to each of the tongue-shaped adjuncts, said protrusion aligned substantially perpendicular to a longitudinal axis of the tongue-shaped adjuncts and wherein the protrusion extend toward the coil support;

projections and recesses furnished at the coil support, wherein the projections and recesses are aligned substantially perpendicular to the longitudinal axis of the coil support, which projections and recesses cooperate with and engage the protrusion of the tongue-shaped adjuncts as a locking engagement.

8. The arrangement according to claim 7, further comprising rail-like parts attached to the closure part, wherein the projections and recesses are delimited by said rail-like parts and which rail like parts are aligned in parallel to a longitudinal axis of the tongue-shaped adjuncts, and which rail-like parts serves as a guide for the tongue-shaped adjuncts.

9. The arrangement according to claim 8, wherein the rail-like parts are disposed at the coil support in the region of the projections and recesses.

10. The arrangement according to claim 7, wherein each of the tongue-shaped adjuncts exhibits a breakout, where an offshoot, provided at the coil support, engages into said breakout.

11. The arrangement according to claim 7 wherein an extension is attached to the closure part and disposed on the side directed toward the inner wall of the cup-shaped casing part, wherein the extension rests under tensioning at the inner wall of the cup-shaped casing part.

12. An arrangement of a coil supported in a cup-shaped formed casing part comprising a coil support;

a cup-shaped casing part having a floor;

a closure part disposed on the side of the coil support remote relative to the floor of the cup-shaped casing part, wherein the closure part is attached to the cup-shaped casing part;

retaining means disposed at oppositely disposed surfaces of the closure part and of the coil support, wherein the retaining means is formed to transmit a clamping tension exerted by the coil support in the direction toward the floor of the cup-shaped casing part after application of the closure part to the coil support for furnishing a connection of the closure part to the coil support;

a permanent magnet disposed in the coil support;

a pole pin connected to the permanent magnet in the direction of the floor of the cup-shaped casing part;

an elastic element supported at the closure part, wherein the elastic element applies force to the permanent magnet and thereby to the pole pin connected to the permanent magnet.

13. The arrangement according to claim 12, wherein the elastic element is formed by a spring.

14. The arrangement according to claim 1, wherein the closure part is formed as a cable feed-through for a cable connecting the electrical device parts disposed in the casing to an electrical device part disposed outside of the casing.

15. An arrangement for fixing the position of a coil support (10, 19, 21) in a cup-shaped formed casing part (1, 2, 22), in particular for the coil support (10, 19, 21) of a pulse tacho-generator, which pulse tacho-generator includes a closure part (4, 8), where the closure part (4, 8) is attached to the cup-shaped casing part (1, 2, 22) on the side of the coil support (10, 19, 21) remote relative to a floor (22) of the cup-shaped casing part (1, 2, 22), wherein retaining means are provided at the closure part (4, 8) and at the coil support (10, 19, 21), whereas the retaining means are formed as matching engaging mechanical structures of a protrusion associated with the closure part and of a recess furnished in association with the coil support, which recess and protrusion cooperate as a snap and lock connection, wherein the retaining means are formed such that the closure part (4, 8) is applied to the coil support (10, 19, 21) under generation of clamping tension exerted by the coil support in a direction toward the floor (22) of the cup-shaped casing part (1, 2, 22).

16. The arrangement according to claim 15, wherein the retaining means are formed of matching engaging mechanical structures of protrusions (13, 29) associated with the closure part (4, 8) and of a recess (12, 30) furnished in association with the coil support (10, 19, 21), which recess (11, 14, 28, 31) cooperate according to the kind of a snap and lock connection.

17. The arrangement according to claim 15, including the following features
(a) the closure part (4, 8) exhibits, on its side disposed toward the coil support (10, 19, 21), tongue-shaped adjuncts (9, 33) running substantially parallel to the longitudinal axis of the cup-shaped casing part (1, 2, 22) extending over the coil support (10, 19, 21);
(b) the tongue-shaped adjuncts (9, 33), exhibits at least one protrusion (13, 29) running perpendicular to the longitudinal axis of the tongue-shaped adjuncts and extending in the direction toward the coil support (10, 19, 21);
(c) projections (11, 14, 28, 31) and recesses (12, 30), running substantially perpendicular to the longitudinal axis of the coil support (10, 19, 21), are furnished at the coil support (10, 19, 21), which projections (11, 14, 28, 31) and recesses (12, 30) coact and engage with the protrusions (13, 29) of the tongue-shaped adjuncts (9, 33) of the closure part (4, 8) in the kind of a locking engagement;
wherein the projections and recesses are delimited by rail-like parts (35) attached to the closure part (4, 8), which rail like parts (35) run parallel to the tongue-shaped adjuncts (9, 33) and which rail-like parts (35) serve as a guide (135) for the tongue-shaped adjuncts (9, 33);
wherein the rail-like parts (35) are disposed at the coil support (4, 19, 21) in the region of the projections (11, 14, 28, 31) and recesses (12, 30).

18. An arrangement for fixing the position of a coil support (210) in a cup-shaped formed casing part (1, 2), in particular for the coil support (210) of a pulse tacho-generator, which pulse tacho-generator includes a closure part (204, 208), where the closure part (204, 208) is attached to the cup-shaped casing part (1, 2) on the side of the coil support (210) remote relative to the floor of the cup-shaped casing part (1, 2), wherein retaining means are provided at the closure part (204, 208) and at the coil support (210), whereas the retaining means are formed as matching engaging mechanical structures of a projections and recesses associated with the closure part and of a protrusions furnished in association with the coil support, which recesses and projections cooperate with the protrusions as a snap and lock connection, wherein the retaining means are formed such that the closure part (204, 208) is applied to the coil support (210) under generation of clamping tension exerted by the coil support in the direction toward the floor (22) of the cup-shaped casing part (1, 2); further including the following features:
(a) the coil support (210) exhibits on its side disposed toward the closure part (204, 208) tongue-shaped adjuncts (209, 233) extending toward the closure part (204, 208) and running substantially parallel to the longitudinal axis of the cup-shaped casing part (1, 2);
(b) one (233) of the tongue-shaped adjuncts exhibits an offshoot (236), running substantially perpendicular to the longitudinal axis of the tongue-shaped adjuncts and extending in the direction of a part of the closure part (204, 208);
(c) projections (214, 231) and recesses (212, 230), running substantially perpendicular to the longitudinal axis of the closure part (204, 208), which projections and recesses cooperate with and engage the protrusions (213, 229) at the tongue-shaped adjuncts (209, 233) of the coil support (210) as a locking engagement;
wherein closure part (204, 208) exhibits a breakout (234), where an offshoot (236), provided at the coil support (210), engages into said breakout (234).

19. An arrangement for fixing the position of a coil support (210) in a cup-shaped formed casing part (1, 2), in particular for the coil support (210) of a pulse tacho-generator, which pulse tacho-generator includes a closure part (204, 208), where the closure part (204, 208) is attached to the cup-shaped casing parts (1, 2) on the side of the coil support (210) remote relative to the floor of the cup-shaped casing part (1, 2), wherein retaining means are provided at the closure part (204, 208) and at the coil support (210) for forming a connection of the closure part (204, 208) with the coil support (210), wherein the retaining means are formed such that the closure part (204, 208) is applied to the coil support (210) under generation of clamping tension exerted by the coil support in the direction toward the floor of the cup-shaped casing part (1, 2); further including the following features:
(a) the coil support (210) exhibits on its side disposed toward the closure part (204, 208) tongue-shaped adjuncts (209, 233) extending toward the closure part (204, 208) and running substantially parallel to the longitudinal axis of the cup-shaped casing part (1, 2);
(b) one (233) of the tongue-shaped adjuncts exhibits an offshoot (236), running substantially perpendicular to the longitudinal axis of the tongue-shaped adjuncts and extending in the direction of a part of the closure part (204, 208);
(c) projections (214, 231) and recesses (212, 230) are furnished at the closure part (204, 208), running substantially perpendicular to the longitudinal axis of the closure part (204, 208), which projections and recesses cooperate with and engage the protrusions (213, 229) of the coil support (210) in the kind of a locking engagement;

wherein the closure part (204, 208) exhibits on its side, disposed toward the inner wall of the cup-shaped casing part (1, 2), an extension (215, 227), which extension rests under pretensioning at the inner wall of the cup-shaped casing part (1, 2).

20. The arrangement according to claim 19, wherein an elastic element (7) is provided, which is supported at the closure part (4, 8) and which applies force at a permanent magnet (16), disposed in the coil support (10, 19, 21), as well as at a pole pin (17, 23), connected to the permanent magnet (16), in the direction of the floor (22) of the cup-shaped casing part (1, 2, 22), and wherein the elastic element (7) is formed by a spring.

21. The arrangement according to claim 15, wherein retaining means for a force-matching connection of the closure part (4, 8) and of the coil support (10, 19, 21) is formed by a recess, provided at the coil support (10, 19, 21), and one protrusion, provided at the closure part (4, 8), which recess and protrusion coact in the snap and lock connection.

22. The arrangement according to claim 18, wherein the retaining means are formed of matching engaging mechanical structures of the projections (214, 231) and of the recesses (212, 230) furnished at in association with the closure part (4, 8), and of protrusions (213, 229) furnished at in association with the coil support (210), which recesses (212, 230) and projections (214, 231) cooperate with the protrusions (213, 229) according to the kind of a snap and lock connection.

23. An arrangement of a bobbin comprising:
a cup-shaped formed casing part having a bottom wall and a peripheral side wall and an open end of the peripheral side wall;
a bobbin, formed by
a bottom flange disposed adjacent to the bottom wall of the cup-shaped second retaining means are formed as matchingly engaging mechanical structures configured as tongue-shaped adjuncts including nose-shaped protrusions, and wherein the first retaining means are furnished with recesses, which recesses and said nose-shaped protrusions engage and are locked as a snap and lock connection.

24. The arrangement according to claim 23, wherein the tongue-shaped adjuncts are attached to the stopper extension of the closure part, which stopper extension is positioned toward the open end of the bobbin extension, wherein the tongue-shaped adjuncts are substantially parallel aligned relative to a longitudinal axis of the peripheral side wall of the cup-shaped casing part, and wherein the tongue-shaped adjuncts extend over an outer end section of the bobbin extension;
wherein the nose-shaped protrusions are located in each case at the tongue-shaped adjuncts of the closure part and runs in a direction perpendicular to a longitudinal axis of the tongue-shaped adjuncts, and wherein the tongue-shaped adjuncts extend in a direction toward the bobbin extension of the bobbin;
wherein the recesses and nose-shaped protrusions form engagement means, wherein the engagement means forms part of the bobbin extension of the bobbin, wherein the engagement means is aligned substantially perpendicular to the longitudinal axis of the bobbin extension of the bobbin, wherein the engagement means engages into the nose-shaped protrusions of the tongue-shaped adjuncts of the closure part for forming a locking engagement.

25. The arrangement according to claim 23, further comprising
a coil wound between the bottom flange and the upper flange onto the bobbin.

26. The arrangement according to claim 23, wherein the recesses are disposed on the outer side of the bobbin extension;
wherein the nose-shaped protrusions of the tongue-shaped adjuncts are directed toward a center axis of the cup-shaped casing part;
further comprising
an extension attached to an end of the tongue-shaped adjuncts directed toward the peripheral wall for pressing the tongue-shaped adjuncts into a locking engagement with the recesses of the bobbin extension.

27. The arrangement according to claim 23, further comprising
a pole pin forming a center cylinder disposed centered in the bobbin;
a permanent magnet having a first end face and having a second end face, wherein the permanent magnet is disposed inside the bobbin extension, and wherein the first end face of the permanent magnet is attached to the pole pin;
a spring disposed between the second end face of the permanent magnet and the closure part for pressing the closure part and the tongue-shaped adjuncts together with the closure part in a direction away from the bottom wall of the cup-shaped casing part.

28. The arrangement according to claim 23, further comprising
an offshoot of the bobbin extension directed radially outward relative to an axis of the bobbin extension for snapping into a breakout in one of the tongue-shaped adjuncts upon plugging together the bobbin and the closure part, wherein the breakout is running in a direction parallel to an axis of the cup-shaped casing part, and wherein the breakout exhibits a larger axial extension than the offshoot of the bobbin extension.

29. The arrangement according to claim 23, further comprising
an expansion section of the cup-shaped part in the area of the open end of the cup-shaped part for providing a seat for the closure part in a transition region from a narrower section to the expansion section;
a snap protrusion in the expansion section of the cup-shaped part;
a snap recess in the closure part matching the position of the snap protrusion where the closure part is positioned to close the cup-shaped part.

30. The arrangement according to claim 23, wherein the tongue-shaped adjuncts are attached to the extension of the closure part, which extension is positioned toward the open end of the bobbin extension, wherein the tongue-shaped adjuncts are substantially parallel aligned relative to a longitudinal axis of the peripheral side wall of the cup-shaped casing part, and wherein the tongue-shaped adjuncts extend over an outer end section of the bobbin extension.

31. The arrangement according to claim 23, wherein the nose-shaped protrusions are located in each case at the tongue-shaped adjuncts of the closure part and run in a direction perpendicular to a longitudinal axis of the tongue-shaped adjuncts, and wherein the tongue-shaped adjuncts extend in a direction toward the bobbin extension of the bobbin.

32. The arrangement according to claim 23, wherein the recesses and nose-shaped protrusions form engagement means, wherein the engagement means forms part of the bobbin extension of the bobbin, wherein the engagement means is aligned substantially perpendicular to the longitudinal axis of the bobbin extension of the bobbin, wherein the engagement means engages into the nose-shaped protrusions of the tongue-shaped adjuncts of the closure part for forming a locking engagement.

* * * * *